US009806969B2

(12) United States Patent
Arora et al.

(10) Patent No.: US 9,806,969 B2
(45) Date of Patent: Oct. 31, 2017

(54) INFRASTRUCTURE TRENDING TOOL

(71) Applicant: BANK OF AMERICA CORPORATION, Charlotte, NC (US)

(72) Inventors: Rahul Arora, Hyderabad (IN); Ashokkumar Govintharaj, Chennai (IN); Sudhakaran Gopalakrishnan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 325 days.

(21) Appl. No.: 14/635,466

(22) Filed: Mar. 2, 2015

(65) Prior Publication Data
US 2016/0261471 A1    Sep. 8, 2016

(51) Int. Cl.
G06F 15/173 (2006.01)
H04L 12/26 (2006.01)
H04L 12/24 (2006.01)

(52) U.S. Cl.
CPC ............ *H04L 43/045* (2013.01); *H04L 41/12* (2013.01); *H04L 41/145* (2013.01); *H04L 41/22* (2013.01); *H04L 43/065* (2013.01)

(58) Field of Classification Search
None
See application file for complete search history.

(56) References Cited

U.S. PATENT DOCUMENTS

| | | | |
|---|---|---|---|
| 6,405,250 B1 * | 6/2002 | Lin | H04L 41/046 700/29 |
| 6,557,008 B1 * | 4/2003 | Temple, III | G06Q 10/109 |
| 7,986,632 B2 * | 7/2011 | Monaco | H04L 43/022 370/231 |
| 2003/0046390 A1 * | 3/2003 | Ball | H04L 41/12 709/224 |
| 2004/0196846 A1 * | 10/2004 | Salonen | H04L 41/12 370/392 |
| 2015/0169692 A1 * | 6/2015 | Klingen | G06F 17/30557 707/722 |

\* cited by examiner

*Primary Examiner* — Umar Cheema
*Assistant Examiner* — John Fan
(74) *Attorney, Agent, or Firm* — Michael A. Springs; Moore & Van Allen PLLC; Peter B. Stewart

(57) ABSTRACT

Embodiments of the invention are directed to systems, methods and computer program products for use in providing infrastructure trending within a network environment. The apparatus proactively queries computing devices within the networked environment and generates infrastructure trending data. An exemplary apparatus is configured to execute an electronic data collection script on one or more computing devices within a networked environment; store the collected machine information in a storage location, whereby the machine information can be accessed, via the storage location, for use in providing infrastructure trending data; receive a request to display an infrastructure trend associated with the network environment; in response to receiving the request, analyze the collected machine information; and generate at least one graph based on the collected machine information, wherein the at least one graph displays the infrastructure trend associated with the network environment.

17 Claims, 15 Drawing Sheets

| | HOME | N UNIX HEALTH | CURRENT MONTH CHARTS | CURRENT MONTH RPT | TRENDING | N DEFINITIONS(s) | ARCHIVED RPT |
|---|---|---|---|---|---|---|---|

1500

1504

Q▽  [     ] GO  ACTIONS ▽ — 1506

CHART
CHART TYPE ○ ≡ □ ◉ ● ⊕ ○ ⋮
   LABEL [Earc ▸]
   VALUE [Id ▸]         — 1508
   FUNCTION [Count ▸]
   SORT [Default ▸]
   [CANCEL] [APPLY]

| | Id | Hostname | Os | Kv | Earc | Nstandard | Uptime |
|---|---|---|---|---|---|---|---|
| ☐ | 53 | Host A | OS 6.4 | KV 2.6 | EARC-DECLINING | N-1 | UPTIME -113days |
| ☐ | 54 | Host B | OS 6.5 | KV 2.6 | EARC-CORE | N | UPTIME -9days |
| ☐ | 55 | Host C | OS 6.4 | KV 2.6 | EARC-DECLINING | N-1 | UPTIME -9days |
| ☐ | 56 | Host D | OS 6.4 | KV 2.6 | EARC-DECLINING | N-1 | UPTIME -147days |

INFRASTRUCTURE TRENDING TOOL

BACKGROUND

Traditionally, corporations or large-scale entities are responsible for maintaining a large infrastructure with respect to their in-house computing and networking systems. Computing devices are often upgraded either individually or in batches, based on the needs of the particular line of business within the entity. As a result, on an enterprise wide level, some computing devices may run newer or more up to date operating systems, applications, and the like, as opposed to others. Thus, manually tracking each computing device's operating system or applications versions becomes a very tedious task that is at vulnerable to data inconsistency.

Furthermore, many corporations have an enterprise standard that defines which versions of an operating system are approved and/or restricted for use within the computing network. It then becomes necessary to ensure that each computing device within the network comprises software according to the specifications of the enterprise standard. Therefore, a need exist for a means to proactively ensure that computing devices within an enterprise are current and compliant with enterprise standards.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention are directed to systems, methods, and computer program products for use in providing infrastructure trending within a network environment, whereby the apparatus proactively queries computing devices within the networked environment and generates infrastructure trending data. An exemplary apparatus of the present invention may comprise a memory; a computing processor; and a module stored in the memory, said module comprising instruction code executable by one or more computing processors, and configured to cause the one or more computing processors to execute an electronic data collection script on one or more computing devices within a networked environment, wherein the electronic data collection script queries the one or more computing devices to electronically collect machine information; store the collected machine information in a storage location, whereby the machine information can be accessed, via the storage location, for use in providing infrastructure trending data; receive a request to display an infrastructure trend associated with the network environment; in response to receiving the request, analyze the collected machine information; and generate at least one graph based on the collected machine information, wherein the at least one graph displays the infrastructure trend associated with the network environment.

In some embodiments, the module is further configured to cause one or more computing processors to query the networked environment to discover the one or computing devices, and in response to discovering the one or more computing devices, automatically configure the one or more computing devices for electronic data collection.

In some embodiments, the module is further configured to cause one or more computing processors to continuously analyze the electronic data collection script to determine one or more areas of improvement, and in response to determining an area of improvement within the electronic data collection script, automatically modify the electronic data collection script.

In some embodiments, the machine information comprises information related to a specific machine parameter, and the module is further configured to cause one or more computing processors to determine the parameter is frequently updated, and in response to determining the parameter is frequently updated, automatically modify the electronic data collection script to increase the frequency of data collection.

In some embodiments, the module is further configured to cause one or more computing processors to present the collected machine information in a raw data format.

In some embodiments, the module is further configured to cause one or more computing processors to determine an industry standard definition, wherein the industry standard definition defines an operating system requirement for the one or more computing devices.

In some embodiments, the module is further configured to cause one or more computing processors to associate the industry standard definition with an alphanumeric identifier.

In some embodiments, the module is further configured to cause one or more computing processors to update the industry standard definition in response to determining a new version of the operating system is utilized within the networked environment.

In some embodiments, the module is further configured to cause one or more computing processors to sort the at least one graph based at least in part on the industry standard.

In some embodiments, the module is further configured to cause one or more computing processors to determine a status of the one or more computing devices, wherein the status is at least one of development, user acceptance testing, quality assurance, or production.

In some embodiments, the machine information comprises information related to a specific machine parameter, and the module is further configured to cause one or more computing processors to aggregate the collected machine information and determine a numeric total of the one or more computing device on which the machine parameter is present.

In some embodiments, the module is further configured to cause one or more computing processors to transmit the at least one graph to a third party.

In some embodiments, the module is further configured to cause one or more computing processors to archive the at least one graph for future presentation, wherein the at least one graph is archived for a predetermined period of time.

In some embodiments, the module is further configured to cause one or more computing processors to provide one or more recommendations for future infrastructure implementation based at least in part of the analysis of the collected machine information and the at least one graph displaying the infrastructure trend.

The features, functions, and advantages that have been discussed may be achieved independently in various embodiments of the present invention or may be combined with yet other embodiments, further details of which can be seen with reference to the following description and drawings. Additionally, as will be appreciated by one of ordinary skill in the art, the features, functions, and advantages that have been discussed may include and/or be embodied as an apparatus (including, for example, a system, machine, device, computer program product, and/or the like), as a method (including, for example, a business method, computer-implemented process, and/or the like), or as any combination of the foregoing.

BRIEF DESCRIPTION OF THE DRAWINGS

Figure 1:
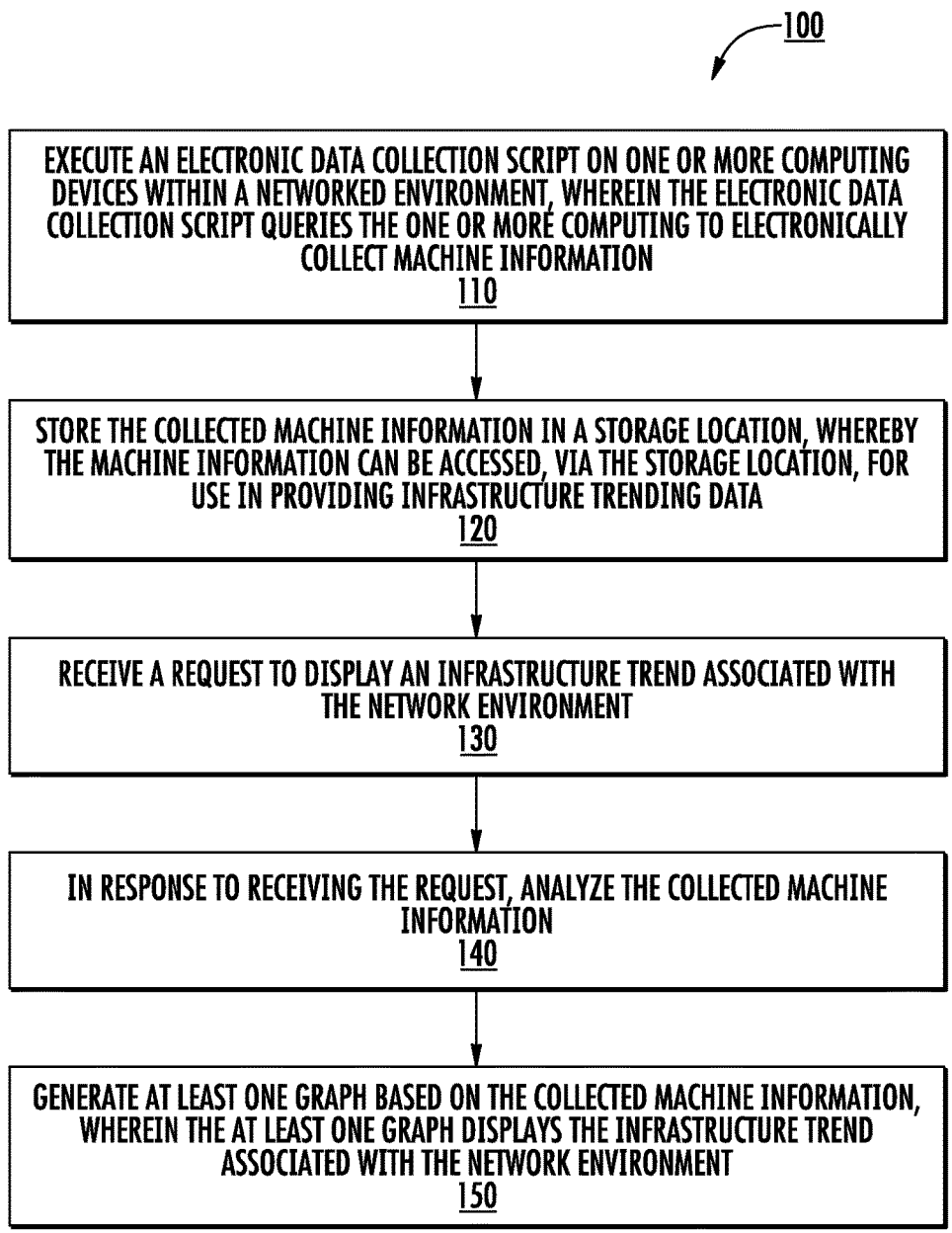
Figure 2A:
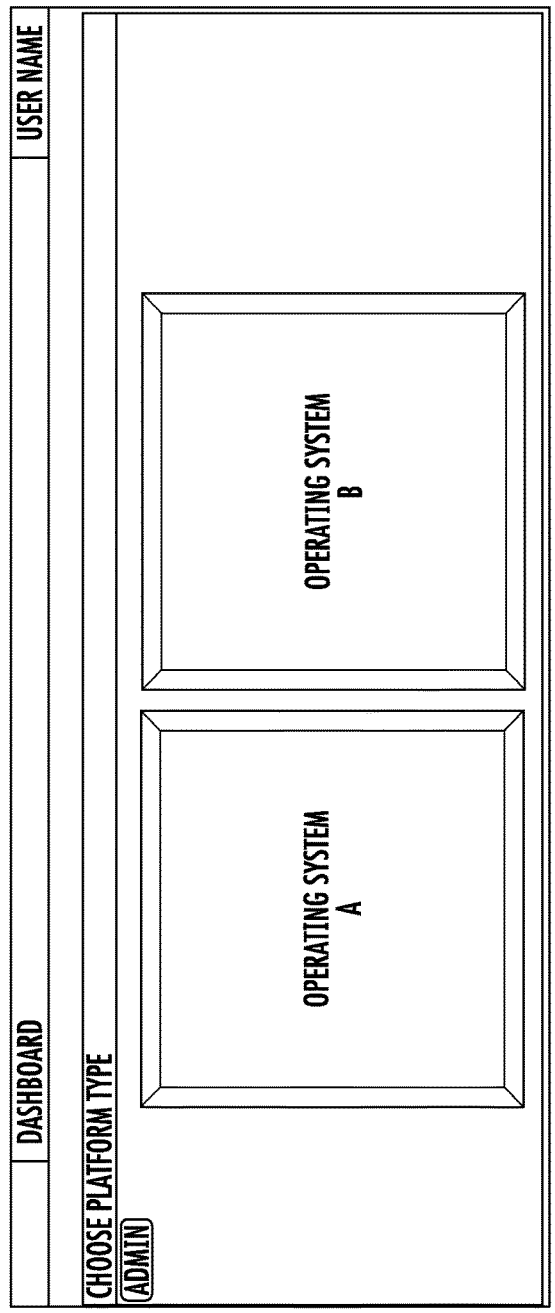
Figure 2B:
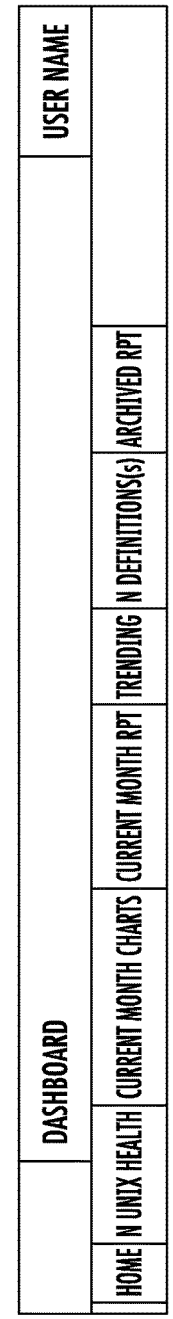
Figure 3:
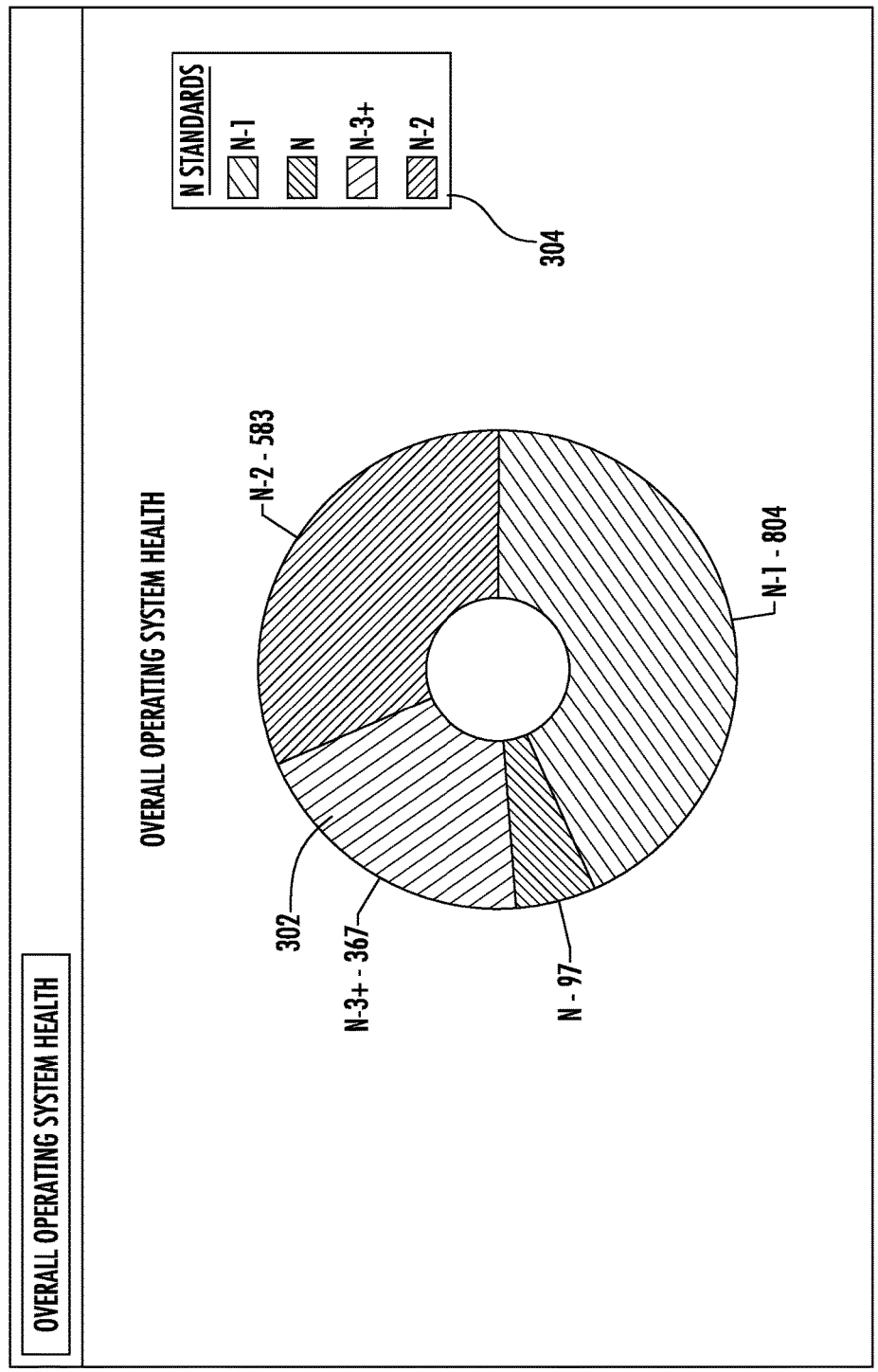
Figure 4:
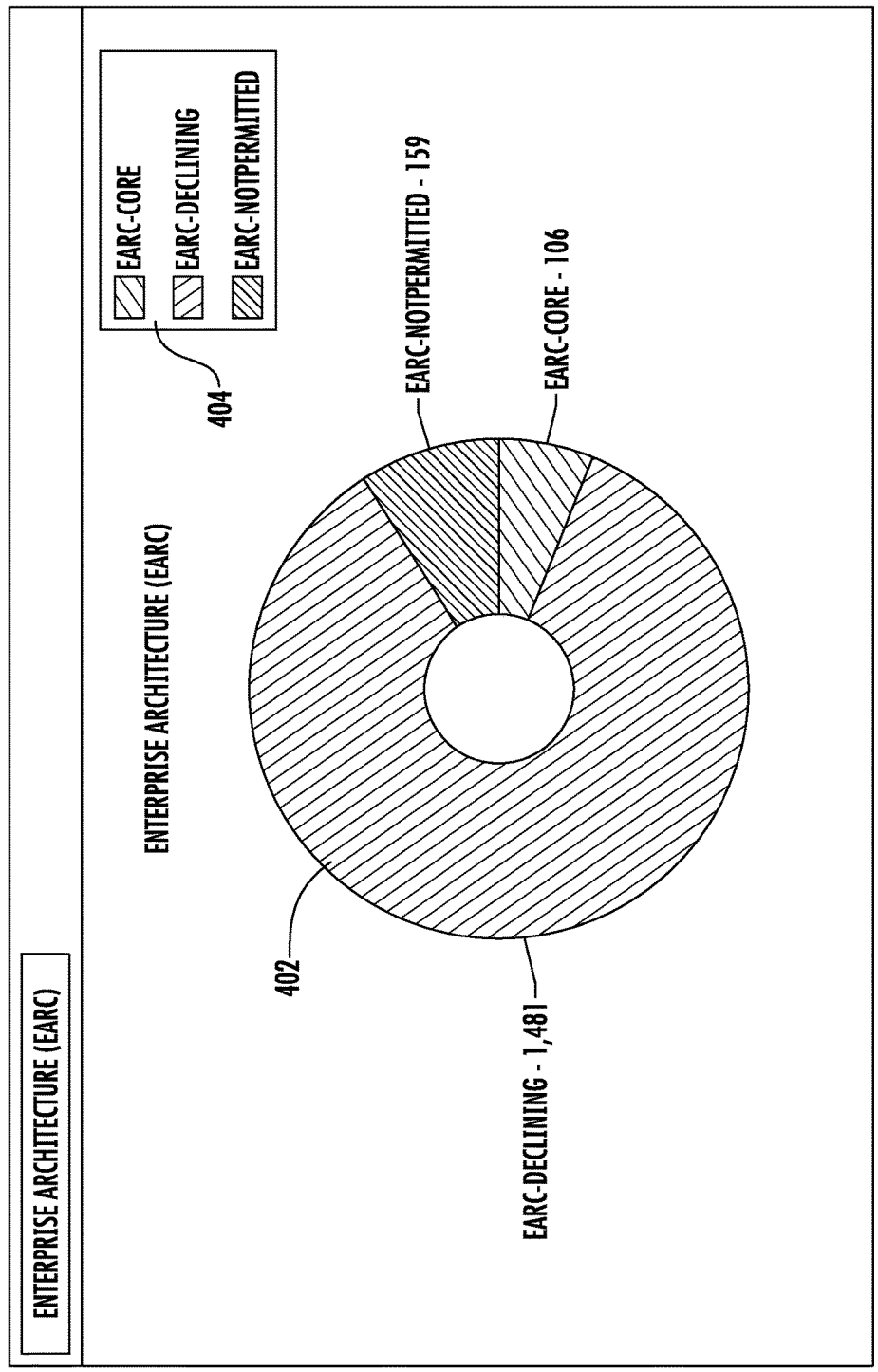
Figure 5:
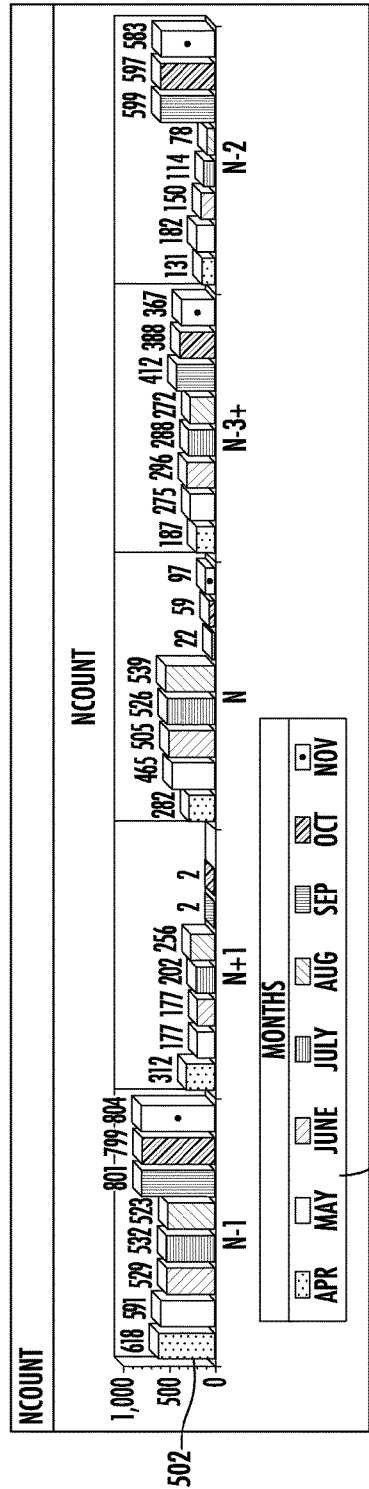
Figure 6:
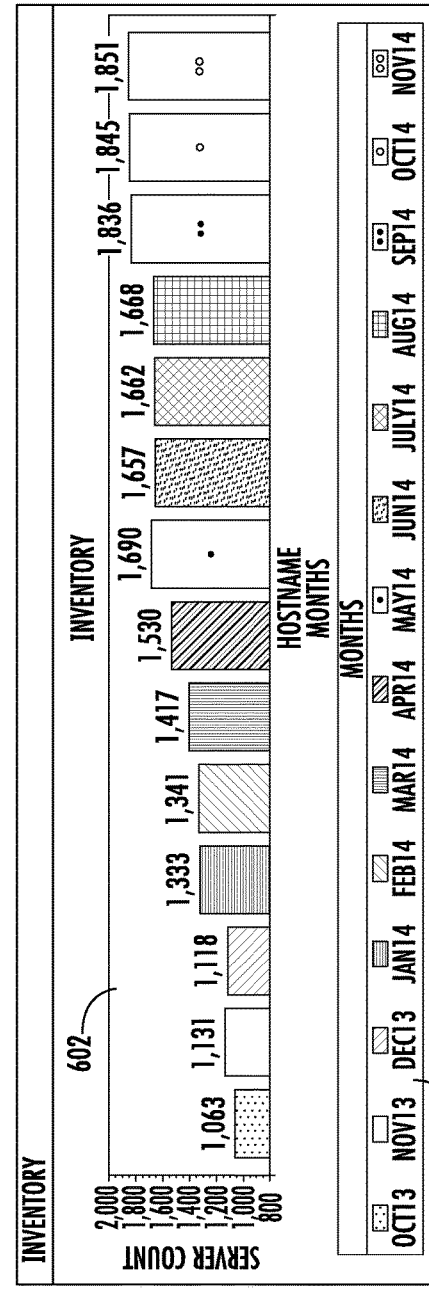
Figure 7:
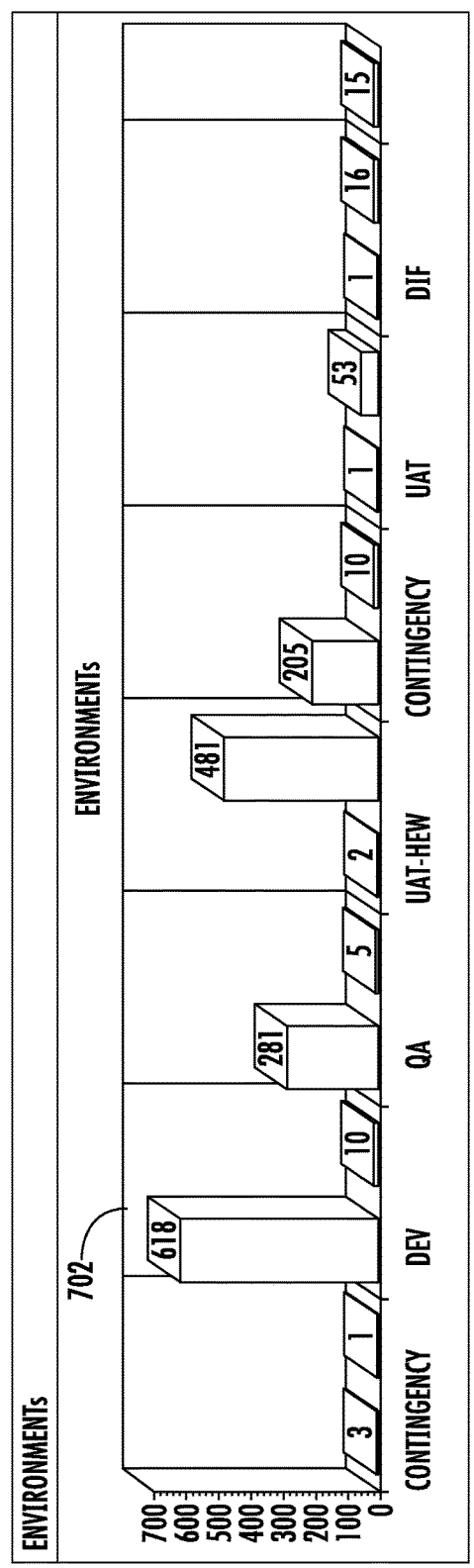
Figure 8A:
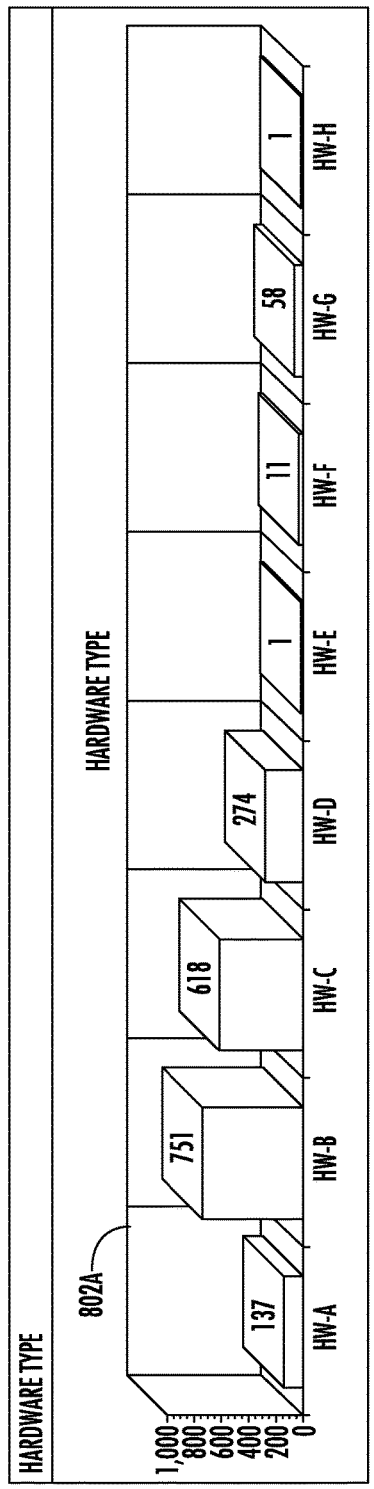
Figure 8B:
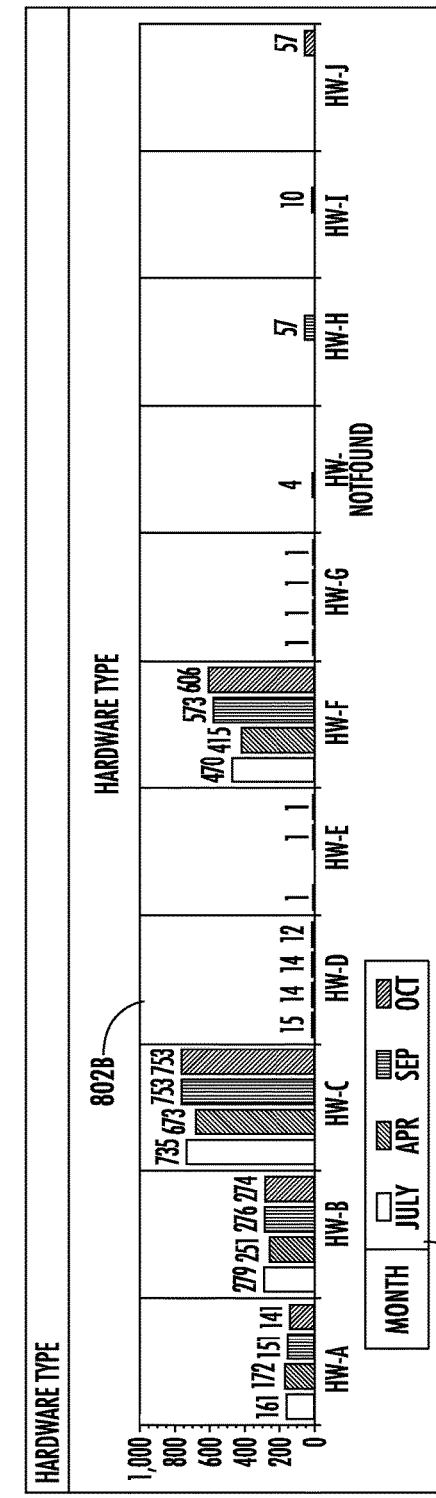
Figure 9:
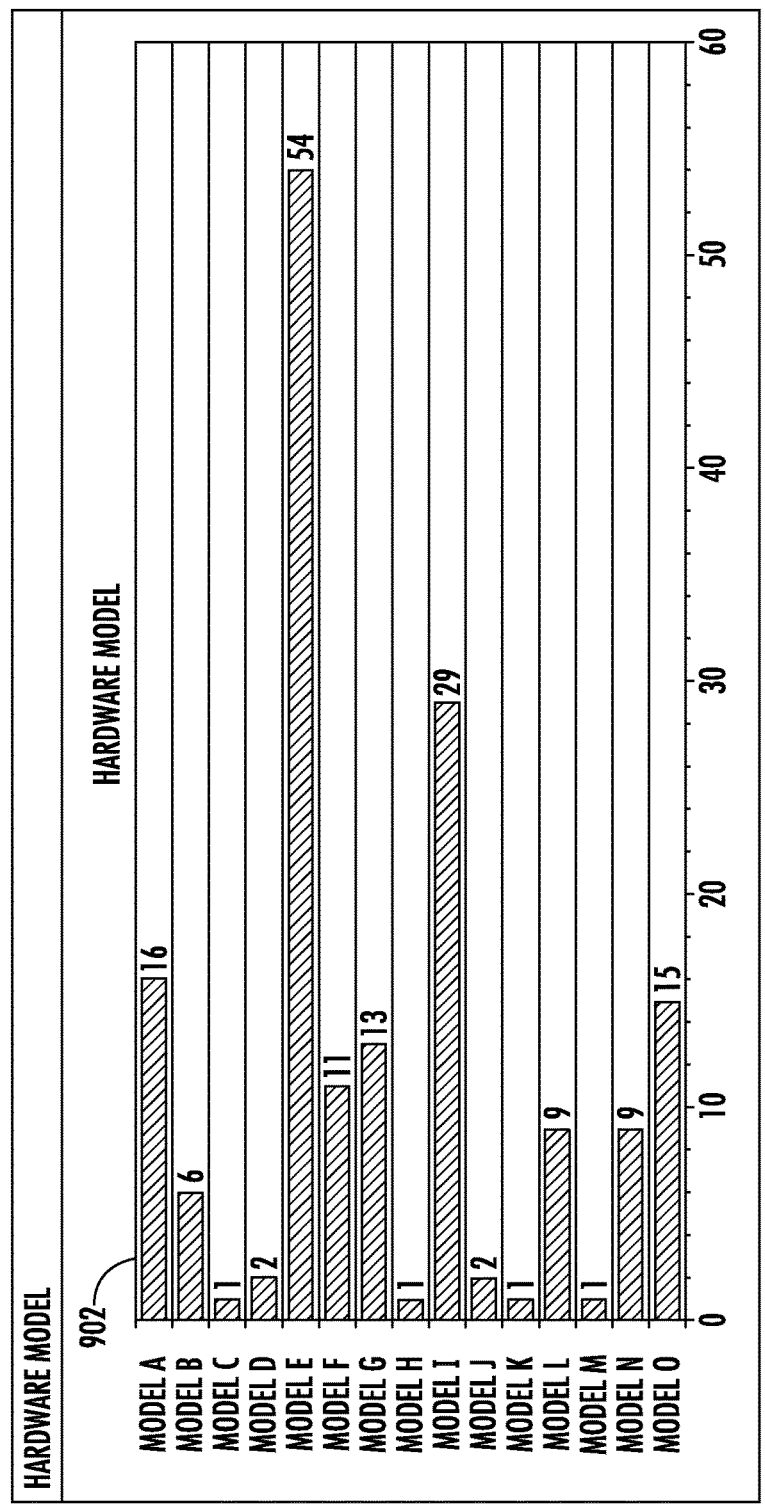
Figure 10A:
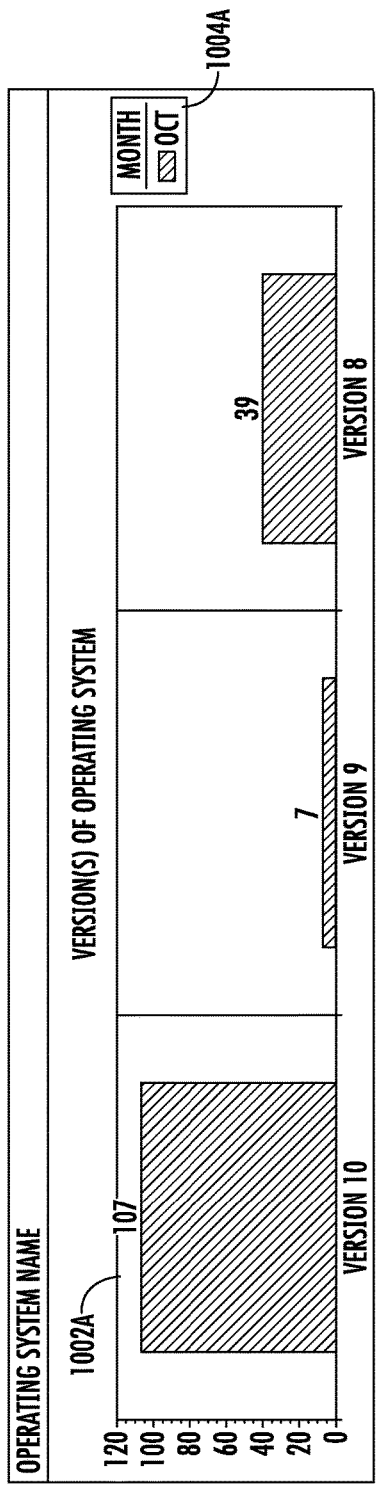
Figure 10B:
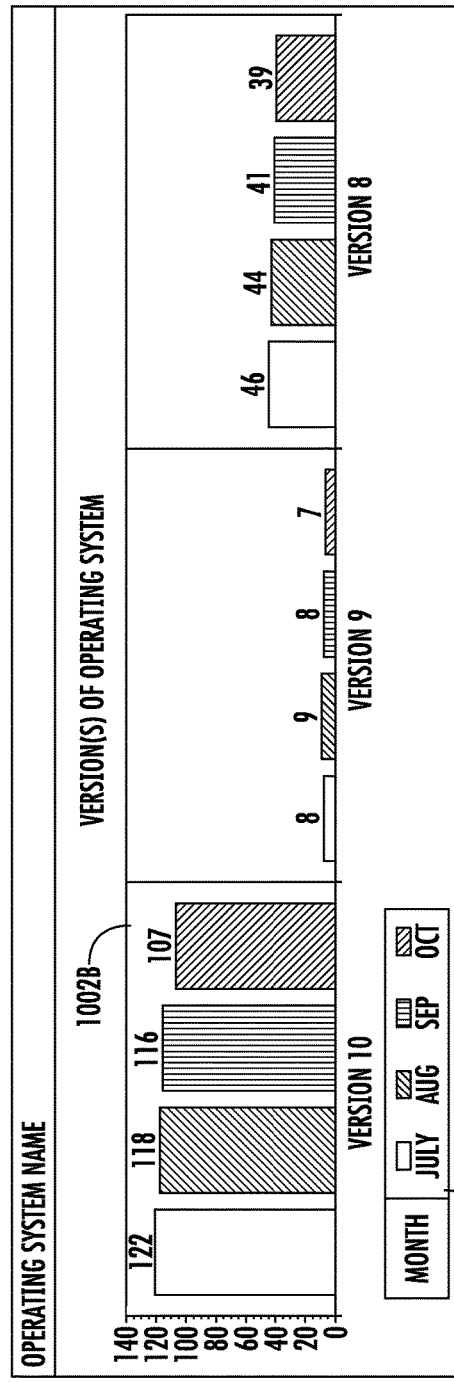
Figure 11:
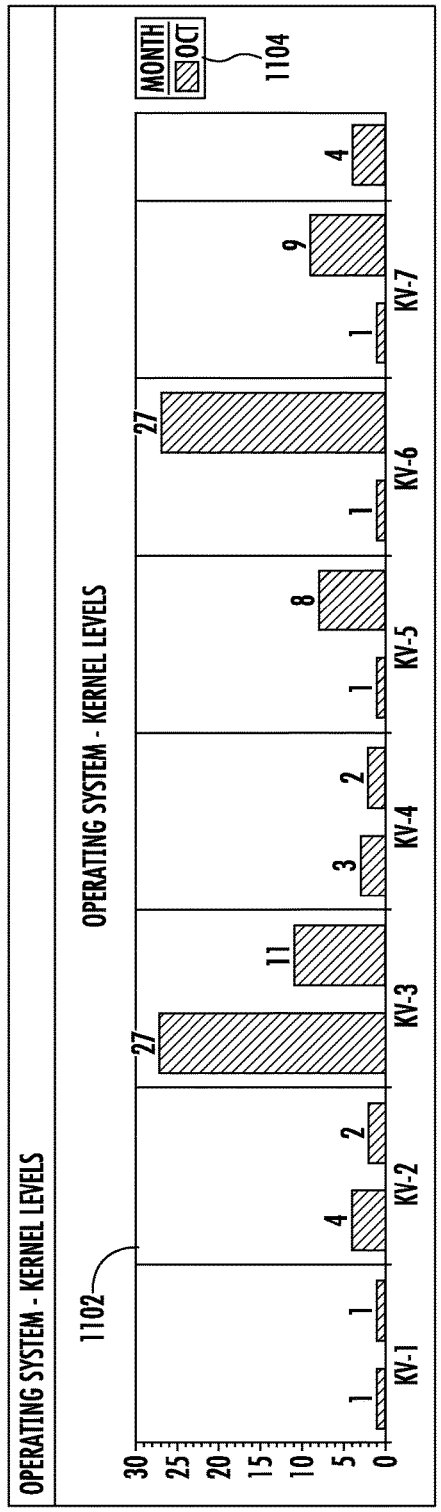
Figure 12:
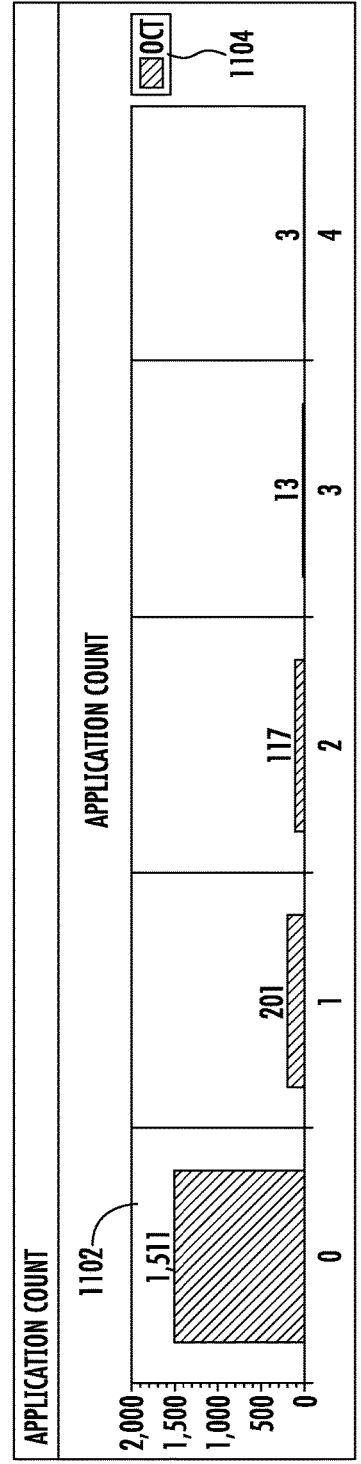
Figure 13A:
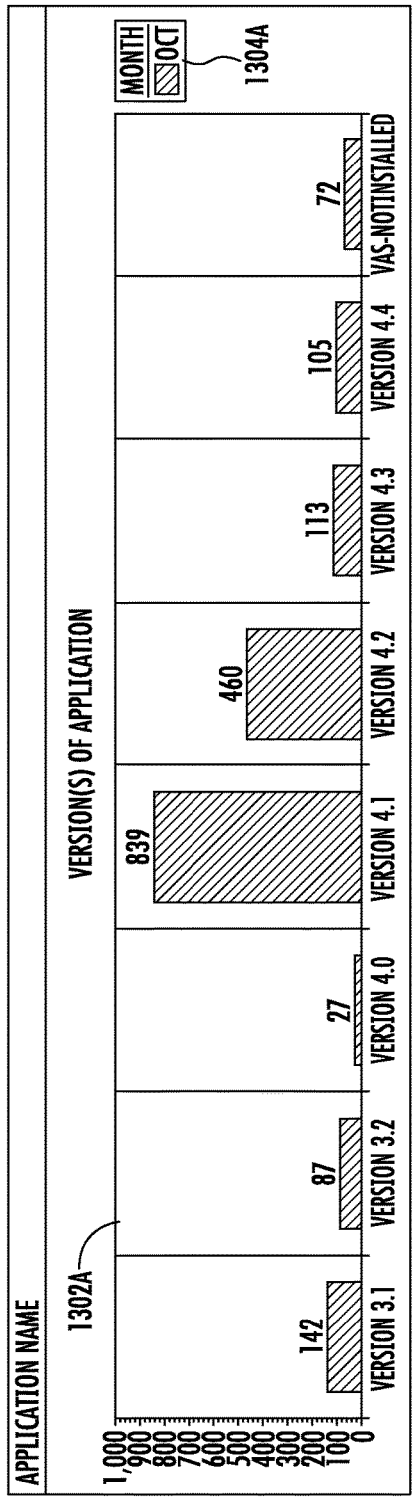
Figure 13B:
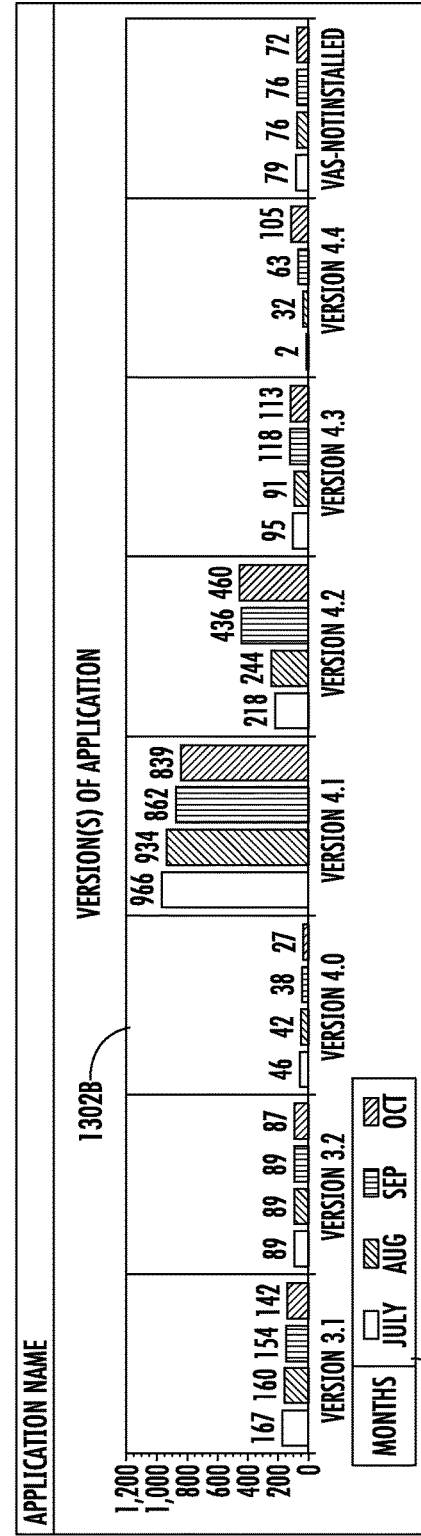
Figure 14A:
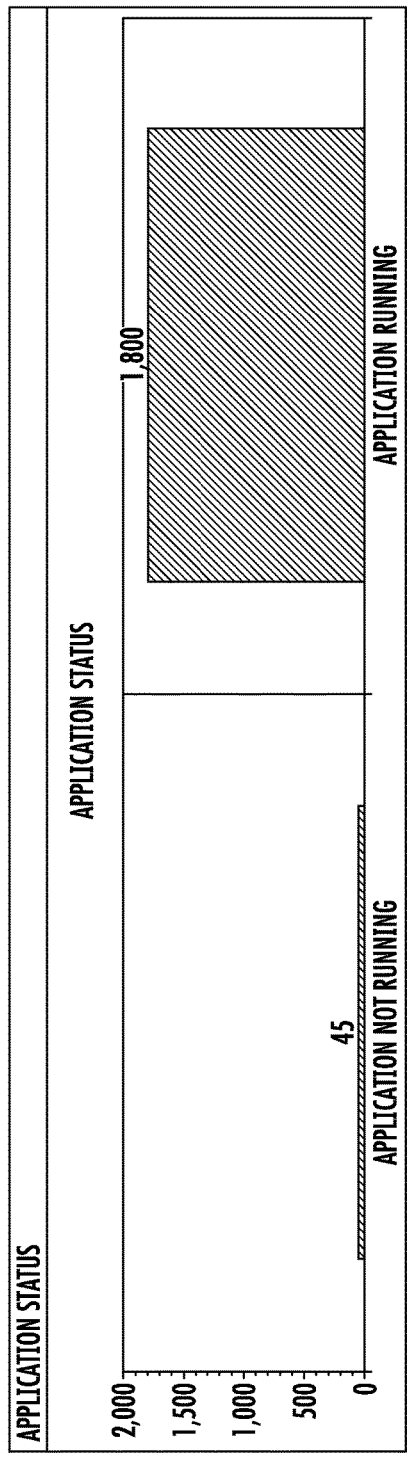
Figure 14B:
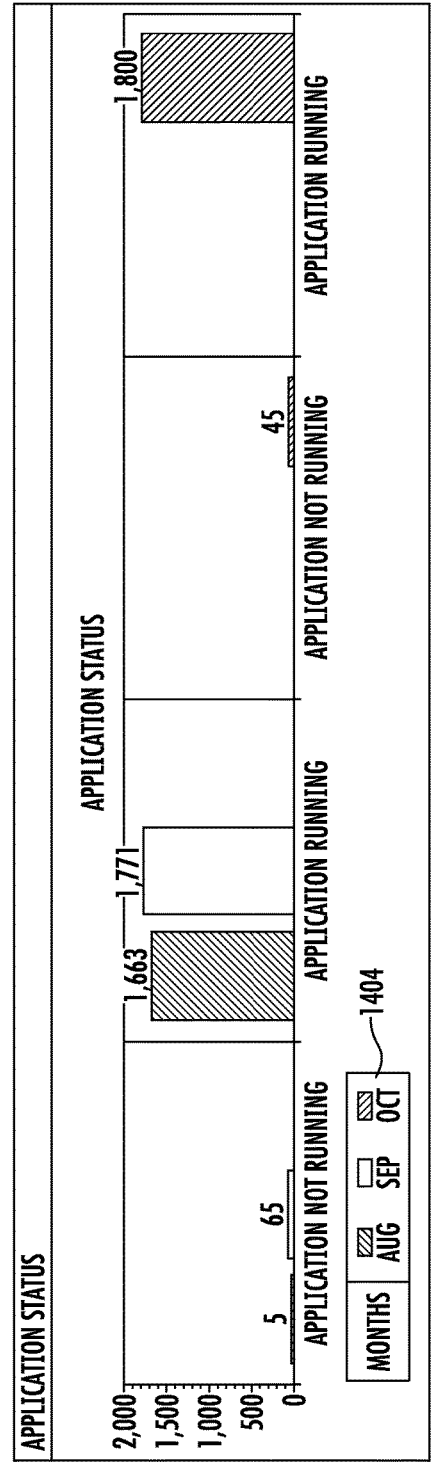
Figure 16:
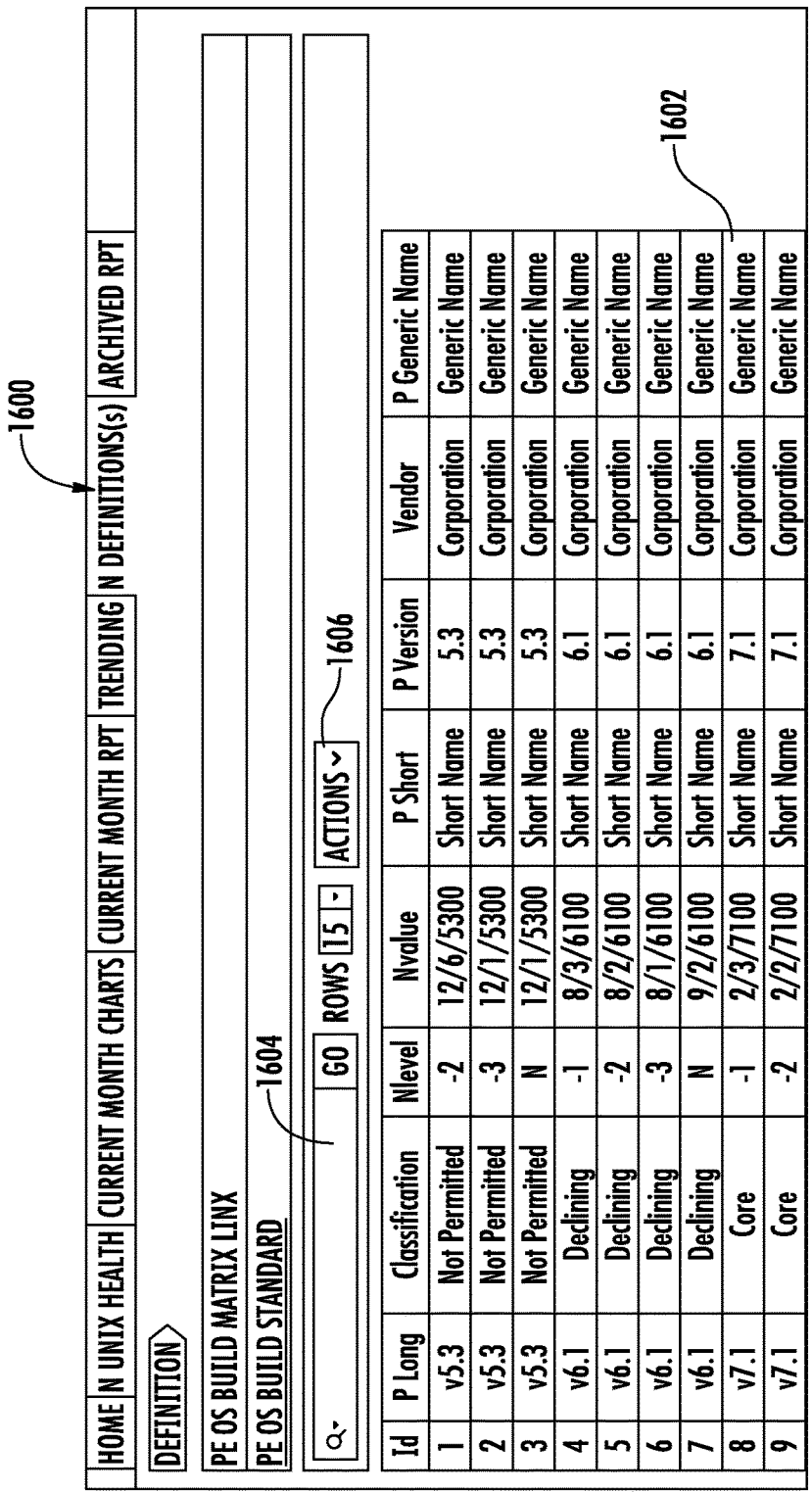
Figure 17:
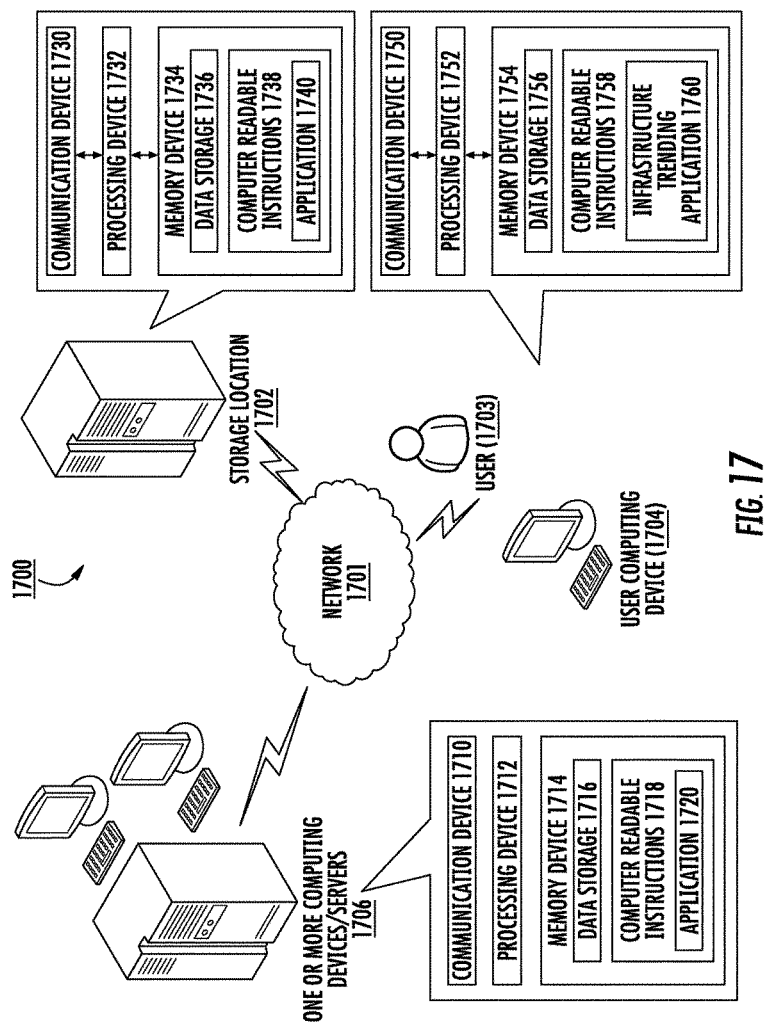

Having thus described embodiments of the invention in general terms, reference will now be made to the accompanying drawings, where:

FIG. 1 is a high level process flow for an infrastructure trending system, in accordance with embodiments of the present invention;

FIG. 2A is screenshot illustrating an infrastructure trending system tool dashboard, in accordance with embodiments of the present invention;

FIG. 2B is screenshot illustrating an infrastructure trending system tool dashboard, in accordance with embodiments of the present invention;

FIG. 3 is screenshot illustrating an infrastructure trending graph, in accordance with embodiments of the present invention;

FIG. 4 is screenshot illustrating an infrastructure trending graph, in accordance with embodiments of the present invention;

FIG. 5 is screenshot illustrating an infrastructure trending graph, in accordance with embodiments of the present invention;

FIG. 6 is a screenshot illustrating an operation analytic repository monitoring system tool, in accordance with embodiments of the present invention;

FIG. 7 is screenshot illustrating an infrastructure trending graph, in accordance with embodiments of the present invention;

FIG. 8A is screenshot illustrating an infrastructure trending graph, in accordance with embodiments of the present invention;

FIG. 8B is screenshot illustrating an infrastructure trending graph, in accordance with embodiments of the present invention;

FIG. 9 is screenshot illustrating an infrastructure trending graph, in accordance with embodiments of the present invention;

FIG. 10A is screenshot illustrating an infrastructure trending graph, in accordance with embodiments of the present invention;

FIG. 10B is screenshot illustrating an infrastructure trending graph, in accordance with embodiments of the present invention;

FIG. 11 is screenshot illustrating an infrastructure trending graph, in accordance with embodiments of the present invention;

FIG. 12 is a screenshot illustrating an operation analytic repository monitoring system tool, in accordance with embodiments of the present invention;

FIG. 13A is screenshot illustrating an infrastructure trending graph, in accordance with embodiments of the present invention;

FIG. 13B is screenshot illustrating an infrastructure trending graph, in accordance with embodiments of the present invention;

FIG. 14A is screenshot illustrating an infrastructure trending graph, in accordance with embodiments of the present invention;

FIG. 14B is screenshot illustrating an infrastructure trending graph, in accordance with embodiments of the present invention;

FIG. 15 is screenshot illustrating an infrastructure trending graph, in accordance with embodiments of the present invention;

FIG. 16 is screenshot illustrating an infrastructure trending graph, in accordance with embodiments of the present invention; and FIG. 17 is a diagram illustrating a networking environment system, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for use in infrastructure trending systems that proactively monitor networked environments and provide visual representations of the networked environment and recommendations for improving the networked environment. The invention enables a system to execute an electronic data collection script on one or more computing devices within a networked environment, wherein the electronic data collection script queries the one or more computing devices to electronically collect machine information; store the collected machine information in a storage location, whereby the machine information can be accessed, via the storage location, for use in providing infrastructure trending data; receive a request to display an infrastructure trend associated with the network environment; in response to receiving the request, analyze the collected machine information; and generate at least one graph based on the collected machine information, wherein the at least one graph displays the infrastructure trend associated with the network environment. As such, logic defined within the data collection script may serve as a center point to implement fetching relevant information from one or more servers and pushing the information in a database and such that it can be utilized within a web tier and/or dashboard and be reflected within a plurality of graphs.

In some embodiments, an "entity" may refer to a business entity that is either maintaining or acting on behalf of an entity maintaining one or more databases for monitoring and data housing. For example, in exemplary embodiments, an entity may be a financial institution, or one or more parties within the financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a customer to establish an account with the entity. An "account" may be the relationship that the customer has with the entity. Examples of accounts include a deposit account, such as a transactional account (e.g., a banking account), a savings account, an investment account, a money market account, a time deposit, a demand deposit, a pre-paid account, a credit account, a non-monetary customer profile that includes only personal information associated with the customer, or the like. The account is associated with and/or maintained by the entity. In other embodiments, an entity may not be a financial institution. In still other embodiments, the entity may be the merchant itself.

In some embodiments, the "customer" or "client" may be a customer (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded).

Method for Providing an Infrastructure Trending Tool

Referring now to FIG. 1, a high level process flow for providing an infrastructure trending tool 100 is illustrated in accordance with one embodiment of the present invention, which will be discussed in further detail throughout this specification. As illustrated, the method may comprise a plurality of steps, including but not limited to, executing an electronic data collection script on one or more computing devices within a networked environment, where the electronic data collection script queries the one or more computing devices to electronically collect machine information 110, storing the collected machine information in a storage location, where the machine information can be accessed, via the storage location, for use in providing infrastructure trending data 120, receiving a request to display an infrastructure trend associated with the network environment 130, and in response to receiving the request, analyze the collected machine information 140, and generating at least one graph based on the collected machine information, where the at least one graph displays the infrastructure trend associated with the network environment 150. It should be noted that as discussed herein, "an infrastructure trend" may refer to "one or more infrastructure trends", wherein the infrastructure trends may be displayed singularly or in combination with one another.

At step 110, the system may first execute an electronic data collection script on one or more computing devices within a networked environment, where the electronic data collection script queries the one or more computing devices to electronically collect machine information. The data collection script may refer to a program or sequence of instructions that are interpreted or carried out by another program or computing processor for the purpose of collecting data from the machine on which the data collection script is executed. Furthermore the term "script" may refer to programs written for a special run-time environment that can interpret (rather than compile) and automate the execution of tasks. The data collection script may be configured to collect and store data for future analysis or monitoring. In some embodiments, the electronic data collection script defines one or more parameters for use a data collection process executed on a computing device or server. It should be noted that as used herein, the terms "computing device" or "host server" may refer to either a physical and/or a virtual machine. The defined parameters may include, but not be limited to, a list of machines, disk groups, volumes, and or directories from which data should be collected, an interval or duration of time (e.g. seconds, minutes, hours, days and the like) during which data should be collected, the type of information to be collected, a list of contact information for providing associated notifications, and the like. In one embodiment, data is collected during monthly intervals. In some embodiments, the data collection script may be configured to collect information such as the operating system type, the operating system version, application versions, the firmware type, memory usage, disk usage, CPU utilization, memory utilization, and the like.

Data collection may occur for one or more computing devices or servers within the networked environment based on the particular needs of the line of business. As such, the electronic data collection script may be configured to individually collect data from each machine on a one-by-one as needed basis, in batches as needed, or the electronic data collection script may be configured to simultaneously collect data from all the machines connected within the networked environment. The electronic data collection script may query or poll each computing device to determine and/or retrieve relevant information.

In one embodiment, executing the electronic data collection script may first comprise automatically configuring the computing device or server for data collection. In such an embodiment, the system may be configured to discover the computing devices connected to the networked environment. The system may be configured to discover machines by pinging the network and determining whether or not a response is received, in which a received response may indicate at least one host within the network. After discovering a computing device, the system may then configure the computing device for data collection. In some embodiments, configuring the computing device for data collection comprises storing the electronic data collection script, and any other files necessary for execution of the data collection script, locally on the computing device. In such an embodiment, an initiation command may be transmitted to the computing device such that in response to receiving the initiation command, the data collection script is configured to automatically execute locally on the computing device.

In other embodiments, configuring the computing device for data collection comprises authenticating and/or receiving authorization to collect data from the computing device. In such an embodiment, the authentication may be based at least partially on user input or general information that verifies that a user (or end machine) responsible executing the electronic data collection script is authorized to access the computing device and collect data or machine information stored therein. The user input or general information may be received from a user access device via the server driver. The user input or general information may typically comprise one or more authentication credentials associated with the user. The requested and/or received authentication credentials may vary based on the machine being accessed and more specifically the type of information that the data collection script is configured to collect. In this way, numerous types and levels of user authentication may exist, and the user may be initially authenticated for a primary level of access to conduct general actions within the machine, and the user may be required to provide a subsequent stricter authentication in an instance where a need exist to conduct an action that is not provided within the primary level of access received. For example, the primary level of access may include the user being able to query the computing device for general machine information by providing a user identification number such that the user is able to retrieve information from the computing device. In an event that the user decides to launch a script for long term monitoring or manipulation of the data on the computing device, the user may be required to provide additional authentication credentials, such as a password, prior to being granted access to perform additional actions within the machine. The user authentication credentials that may include, but not be limited to, a username, user identification number, password, account number, full-length social security number or partial digits, challenge questions, familiar pictures and/or phrases, biometrics, key fob-based alphanumeric codes, and the like. In some embodiments, the user authentication credentials are explicitly provided by the user, and in other embodiments the user authentication credentials are stored within the user's device and automatically transferred, in response to a request, to collect data on the user's behalf.

In some embodiments, the system may receive a request to update the electronic data collection script. In such an embodiment, the system, or an administrator and/or end user associated with the system, may continuously analyze the electronic data collection script to determine points of improvement and update the script as needed based on the requirements of the line of business. In this event that the data collection script is analyzed by an administrator and/or end user associated with the system, the system may be configured to receive, from the administrator, a request to update the data collection script in which the request may specify to either add and/or remove a parameter from the data collection script such as the type of information to be collected during the data collection process. Additionally, the request may specify to alter one or more parameter within the data collection script such as the frequency or duration of the data collection process. As such, the periodic updates to the data collection script may alter the span of time for which information is available for any given parameter. For example, if the data collection script has been executed for the period of four months, four months of collected data may be stored for a first parameter, and two months of data may be stored for a second parameter in response to the second parameter being added to the data collection script two months after the initial execution.

In some embodiments, the system may be configured to more frequently collect data associated with a specific parameter such as an application type in response to determining that the parameter is frequently updated. For example, at least one computing device may run an application, Application A, which is known for having an increase in security vulnerabilities, as such the application may be frequently updated by the associated developer to correct security vulnerabilities. As such, any given computing device may have multiple instances of a single application due to the frequent updates which may subsequently pose a safety issue to the line of business. The system may be configured to first determine, based on the collected machine information, that the rate at which the application is updated is frequent, and in response to determining that the application is frequently updated the system may update the electronic data collection script to increase the frequency at which data is collected for the single application parameter which corresponds to Application A. As such, on some embodiments, the parameter refers to the number of extensions of a particular application that is running on the computing device.

At step 120, after executing the electronic data collection script on the one or more computing devices within the networked environment, the system may store the collected machine information in a storage location. The stored machine information may then be accessed, via the storage location, for use in providing infrastructure trending data. The storage location may include any type of data storage such as a storage location on a server, a hard disk or hard drive, a datastore, a database, a cache, a memory, or the like. Additionally, a storage location may refer to an environment, an application, web logic, an object store, a file system, underlying network connectivity, or the like, or a repository associated with (e.g., corresponding to) an environment, an application, web logic, an object store, or the like.

In some embodiments, the data and/or machine information may be stored within the storage location for a predetermined time period (e.g. hours, days, weeks, months, years, quarterly, and the like). The predetermined time period may be defined by an end user based on user preferences, or defined based on business rules associated with the entity responsible for maintaining the databases, or the businesses associated with the data being maintained. Inasmuch, it should be noted that the system may be configured such that any predefined parameters or definitions such as a predetermined period of time may be overridden by one of the previous definitions disclosed herein based on the priority of the entity responsible for providing the definition. For example, in one embodiment, priority may be assigned to a business associated with the data being maintained such that if a user has specified in there user preferences that data should be stored for the period of one (1) year, and the related business has defined within their business preferences that data should be stored for a maximum of six (6) months, then the later definition of the predetermined period of time will override the user preferences such that the data is only stored for a predetermined period of six (6) months. In some embodiments, the system may restrict an entity (e.g. user, business, or the like) for defining a predetermined period of time that conflicts that a prioritized definition for a predetermined period of time. For example, in one embodiment, priority may be assigned to a business associated with the data being maintained such that if a user attempts to specify in there user preferences that data should be stored for the period of one (1) year, and the related business has defined within their business preferences that data should be stored for a maximum of six (6) months, then the later definition of the predetermined period of time will override the user preferences such that the system may prompt the user to provide a predetermined period of six (6) months or less.

In some embodiments, storing the collected machine information in a storage location comprises maintaining the machine information within the storage location such that the data is preserved and not manipulated during the predetermined period of time. In such an embodiment, the data may be determined to be preserved within the predetermined period of time such that a user cannot delete or otherwise edit the original data stored within the database. In other embodiments, storing the collected machine information in a storage location comprises updating the previously stored machine information each time the data collection script is executed.

At step 130, the system may receive a request to display an infrastructure trend associated with the networked environment, and at step 140, in response to receiving the request, the system may analyze the collected machine information. The request may be received in response to a user selecting an option via the infrastructure trending tool to display and infrastructure trend. In one embodiment, a dashboard associated with the infrastructure trending tool may be configured to receive user input where the user may specify, within the request, the type of infrastructure trend to be displayed. In another embodiment, the system may comprise a predefined definition for type(s) of infrastructure trends to display in response to the user requesting to display an infrastructure trend. For example, in one embodiment, the user may request to display an infrastructure trend by selecting an option, on the infrastructure trending tool dashboard, to display system health information associated with the networked environment. In response to the user selecting the option to display system health information, the system may display a plurality of infrastructure trends, where the types of infrastructure trends to be displayed have been predefined by either the user, the business entity, an associated third party, or the like.

In some embodiments, analyzing the data further comprises presenting the data in a raw format such as in a spreadsheet. The system may provide one or more options for further interacting with the raw data including downloading, exporting, transmission via email, manually altering, and the like. Analyzing the machine information may first comprise receiving and/or determining an industry standard definition, where the industry standard defines a set of criteria or requirements for applications and/or operating systems that are acceptable for use within the networked environment, or more particularly that are acceptable for use by the business entity in general. For example, the industry standard may specify that version X of an operating system is the oldest operating system that is acceptable for use on computing devices or servers within the networked environment.

In some embodiments, defining the industry standard further comprises associating the industry standard with a numeric or alphabetic identifier. For example, an alphabetic identifier such as "N" may indicate the industry standard for any given application or operating system, and a plus or minus "+/−" numeric identifier may indicate whether or not the version of the given application or operating system precedes or follows the industry standard version, and may further indicate the degree by which the version precedes or follows the industry standard version. As such, an appropriate identifier may be associated with or assigned to each machine or network parameter, where the identifier may indicate the parameter's relevancy to the industry standard. For example, Version 5 of an operating system may be the industry standard and according noted by and/or associated with the identifier "N", "N+0", or "N−0", the prior version (e.g. Version 4) of the operating system may then be noted by and/or associated with the identifier "N−1", and the most recent version (e.g. Version 6) of the operating system may then be noted by and/or associated with the identifier "N+1". Similar notations may be made for other versions that precede or follow the industry standard version by one or more years.

In some embodiments, the system may be configured to modify and/or update the industry standard in response to determining that a new version of an operating system is available or being used within the networked environment. In some embodiment the automated determination modify and/or update the industry standard may be based on one or more business rules. For example, the business rules may indicate that for each new version of an application or operating system, the industry standard should automatically be updated by one degree. For instance, in line with the previously example, if a newer version of the operating system (e.g. Version 7) is implemented within the networked environment, the system may determine to automatically update the industry standard. The industry standard may then be adjusted by one degree such that the new "N" value is Version 6 of the operating system, Version 5 corresponds to "N−1", Version 4 corresponds to "N−2", and Version 7 corresponds to "N+1".

In some embodiments, analyzing the data further comprises determining a pipeline status of each machine within the networked environment, where the pipeline of the networked environment represents which of the active computing devices and servers are within a development, testing, or production environment. As such, the analysis may provide continuous quality assurance for the networked environment. For instance, computing devices determined to be within the development or testing environment may be noted a having a lower security exposure factor as opposed to computing devices that are within the production environment.

In some embodiments, analyzing the data comprises aggregating the data and determining an overall sum for each parameter collected. For example, if the parameter is related to Application Y, the system may aggregate the collected data and provide a total sum of machines that currently have an installation of Application Y. Similar summations may be determined for other parameters such as hardware type, hardware model, and the like. As such, in some embodiments, the overall sum may be utilized as an inventory report. The inventory report may then serve as an overall illustration or synopsis of the hardware that is associated with each server or computing device within the networked environment.

At step 150, after analyzing the collected machine information, the system may generate at least one graph based on the collected machine information, wherein the at least one graph displays the infrastructure trend associated with the network environment. The generated graph may be presented on a display associated with a user device. In some embodiments, the generated graph may be presented via a graphical user interface associated with the infrastructure trending tool. In an alternate embodiment, the generated graph may be transmitted and/or communicated to the requesting user, business personnel, or a third party. Graphing an infrastructure trend may further comprise determining one or more data points for the graph based on an aggregation of the collected machine information. The graph may be categorized or sorted based on the industry standard. The system may be further configured to archive data and/or graphs that have been previously generated by the infrastructure trending tool. In some embodiments, the current or archived graphs may be modified based on a change in the industry standard.

In some embodiments, the system may be configured to provide one or more recommendations for future infrastructure implementation based on the currently displayed infrastructure trend. As such, the recommendation may provide suggestions or implement strategies that may reduce the security vulnerability of the business. For example, if the infrastructure trending graph displays that the networked environment comprises several computing devices that are running outdated operating systems; the system may provide a recommendation to upgrade the computing devices to a more recent operating system. Likewise, if the infrastructure trending graph displays that several computing devices within the networked environment are running one or more instances of an application that is vulnerable to security attacks, the system may provide a recommendation to remove the application from the computing devices. In some instances, the computing device may require the application based on the particular needs of the line of business. In this situation, the system may be further configured to query the computing device or owner via email or another form of messaging to determine whether or not the application is required or needed, and in response to receiving a response that determines the application is not required or needed, the system may be configured to automatically remove the application from the computing device thus reducing the security vulnerability of the computing device and the networked environment at-large. In another embodiment, the system may suggest to upgrade a particular computing device based on a change in the industry standard.

In some embodiments, the system may be further configured to determine an enterprise architect standard, where the enterprise architect standard indicates declining parameters of the networked environment, core parameters of the networked environment, and non-permitted parameters of the networked environment. In such an embodiment, the system may provide recommendations to adjust the enterprise architect standard. For example, in one embodiment, the system may recommend to remove the non-permitted parameters.

Infrastructure Trending Tool

Referring now to FIG. 2 through FIG. 16, FIG. 2 through FIG. 16 provide more detailed illustrations of the infrastructure trending tool according to various embodiments discussed herein. The infrastructure trending tool comprises various tabs or categories for selection including, but not limited to, a home page, system health information, current month charts, current month reports, infrastructure trending (e.g. month to month trends), definition(s) information, archived reporting, and the like. The options may be centrally displayed via a dashboard associated with the infrastructure trending tool. In some embodiments, infrastructure trending tool may comprise an interface that presents one or more user input fields for receiving user authentication credentials prior to granting access to the infrastructure trending tool. For example, a user identification input field may be presented and configured for receiving and verifying a user identification number, and a password input field may be presented and configured for receiving and verifying a user password. Furthermore, in one embodiment, the tool may be associated with a specific type of operating system such that the data is only associated with a selected operating system type, wherein the operating system may be specified by the user in the request to display an infrastructure trend. In one embodiment, when the infrastructure tool is initially launched the system may be configured to present the user with an option to select a specific operating system type for which data will be displayed. For example, as shown in FIG. 2A, after providing authentication credentials for accessing the infrastructure trending tool, the system may be further configured to present the user with an option to select an operating system for which related infrastructure trends may be displayed. In response to the user selecting operating system A, the system may present infrastructure trending information related to operating system A.

As illustrated in FIG. 3, in one embodiment, the infrastructure trend may be related to the overall health of the networked environment and in response to a user selecting the option to present system health information, the system may present a graph that displays the overall health of the networked environment. In a specific example, the overall health of the networked environment may refer to the relevancy of the networked environment with respect to the industry standard such that the graph displays a numerical and/or graphical representation of the computing device(s) operating systems with respect to the industry standard. For example, as illustrated in FIG. 3, the system may be configured to present a pie chart 302 that displays 97 computing devices are operating according to the industry standard, 804 computing devices are one degree behind the industry standard, 583 computing devices are two degrees behind the industry standard, and 367 computing devices are three or more degrees behind the industry standard. As such any portion of the graph may represent a cumulative or aggregated sum for one or more degrees of an N value. In addition to presenting the pie chart 302 or another graphical representation, the system may also be configured to present a legend 304 that details which portion of the pie chart 302 correspond to the industry standard degrees (e.g. N, N−1, N−2, N−3+).

As illustrated in FIG. 4, in one embodiment, the infrastructure trend may be related to the enterprise architecture of the networked environment and in response to a user selecting the option to present system health information, the system may present a graph that displays the enterprise architecture of the networked environment. In a specific example, the graph displays a numerical and/or graphical representation of the enterprise architecture standard for the networked environment as a whole. For example, as illustrated in FIG. 4, the system may be configured to present a pie chart 402 that displays 1,481 computing devices within a declining stage, 106 computing devices are within a core stage, and 159 computing devices are not permitted. In addition to presenting the pie chart 402 or another graphical representation, the system may also be configured to present a legend 404 that details which portion of the pie chart 402 correspond to the enterprise architecture definition (e.g. Core, Declining, Non-Permitted).

As illustrated in FIG. 5, in one embodiment, the infrastructure trend may be related to an industry standard count (e.g. N Count) of the networked environment and in response to a user selecting the option to present system health information, the system may present a graph that displays the N Count of the networked environment. In a specific example, the industry standard count of the networked environment may refer to the relevancy of the networked environment with respect to the industry standard such that the graph displays a numerical and/or graphical representation of the computing device(s) operating systems with respect to the industry standard. In such an embodiment, the system may present the N Count of the networked environment via a bar graph 502, wherein the vertical axis of the bar graph denotes a numerical sum of computing devices, and the horizontal axis of the bar graph denotes a corresponding degree with respect to the industry standard. The graph may be further categorized based on the corresponding month. As such, in addition to presenting the bar graph 502 or another graphical representation, the system may also be configured to present a legend 504 that details which portion of the bar graph 502 corresponds to a specific month. For example, as illustrated in FIG. 5, the system may be configured to present a bar graph 502 that displays, for the N−1 standard, 618 computing devices were operating according to the industry standard minus one degree in the month of April, 591 computing devices were operating according to the industry standard minus one degree in the month of May, 529 computing devices were operating according to the industry standard minus one degree in the month of June, 532 computing devices were operating according to the industry standard minus one degree in the month of July, and the like.

As illustrated in FIG. 6, in one embodiment, the infrastructure trend may be related to an inventory of the networked environment and in response to a user selecting the option to present system health information, the system may present a graph that displays an inventory count of the networked environment. In a specific example, the graph displays a numerical and/or graphical representation of the number of computing device(s) within the networked environment. In such an embodiment, the system may present the inventory of the networked environment via a bar graph 602, wherein the vertical axis of the bar graph denotes a numerical sum/count of computing devices or servers within the networked environment. The graph may be further categorized based on the corresponding month and/or year. As such, in addition to presenting the bar graph 602 or another graphical representation, the system may also be configured to present a legend 604 that details which portion of the bar graph 602 corresponds to a specific month. For example, as illustrated in FIG. 6, the system may be configured to present a bar graph 602 that displays, the networked environment had a total of 1,063 servers in the month/year of October 2013, the networked environment had a total of 1,131 servers in the month/year of November 2013, the networked environment had a total of 1,118 servers in the month/year of December 2013, and the networked environment had a total of 1,333 servers in the month/year of January 2014, and the like.

As illustrated in FIG. 7, in one embodiment, the infrastructure trend may be related to an environmental stage count of the networked environment and in response to a user selecting the option to present system health information, the system may present a graph that displays a count of the total number of computing devices within a particular environment within the networked environment. In a specific example, the graph displays a numerical and/or graphical representation of the number of computing device(s) within either an environment and/or stage of contingency, development ("Dev"), quality assurance ("QA"), user acceptance testing ("UAT"), and the like. In such an embodiment, the system may present the environmental stage count of the networked environment via a bar graph 702, wherein the vertical axis of the bar graph denotes a numerical sum/count of computing devices or servers within the networked environment, and the horizontal axis defines a corresponding environment or stage. For example, as illustrated in FIG. 7, the system may be configured to present a bar graph 702 that displays, the networked environment has a total of 3 servers in the contingency stage, the networked environment has a total of 618 servers in the development stage, the networked environment has a total of 281 servers in the quality assurance, and the like.

As illustrated in FIG. 8A, in one embodiment, the infrastructure trend may be related to a hardware type count of computing devices for the current month and in response to a user selecting the option to present system health information, the system may present a graph that displays a count of the total number of computing device(s) hardware types within the networked environment. In a specific example, the graph displays a numerical and/or graphical representation of the number of computing device(s) hardware types, where the hardware type may be related to physical and/or virtual machines. In such an embodiment, the system may present the hardware type count of the networked environment via a bar graph 802A, wherein the vertical axis of the bar graph denotes a numerical sum/count of computing devices or servers within the networked environment, and the horizontal axis defines a corresponding hardware type (e.g. hardware name or identifier). For example, as illustrated in FIG. 8A, the system may be configured to present a bar graph 802A that displays, the networked environment has a total of 137 computing devices of hardware type A, the networked environment has a total of 751 computing devices of hardware type B, the networked environment has a total of 618 computing devices of hardware type C, and the like.

Likewise, as illustrated in FIG. 8B, in one embodiment, the infrastructure trend may be related to a hardware type count of computing devices for a plurality of months and in response to a user selecting the option to present infrastructure month to month trending, the system may present a graph that displays a count of the total number of computing device(s) hardware types within the networked environment on a month to month basis. The graph may be further categorized based on the corresponding month and/or year. As such, in addition to presenting a bar graph 802B or another graphical representation, the system may also be configured to present a legend 804 that details which portion of the bar graph 602 corresponds to a specific month. For example, as illustrated in FIG. 8B, the system may be configured to present a bar graph 802B that displays, the networked environment had a total of 161 computing devices of hardware type A in the month of July, the networked environment had a total of 172 computing devices of hardware type A in the month of April, the networked environment had a total of 151 computing devices of hardware type A in the month of September, and the networked environment had a total of 141 computing devices of hardware type A in the month of October. Further, the system may be configured to determine a sum or count of computing devices for which the hardware type was not found. It should be noted that the number of months for which data may be displayed may alter based on the number of months for which data has been collected and store. In this way, one or more graphs may have a greater or lesser amount of data to display for any given infrastructure trend. For example, if Hardware Type B was first utilized in the month of July 2013 and hardware C was first utilized in the month of August 2013 then as a result an extra month of data may be collected and available for infrastructure trending for Hardware Type B.

As illustrated in FIG. 9, in one embodiment, the infrastructure trend may be related to a hardware model type count of computing devices and in response to a user selecting the option to present system health information, the system may present a graph that displays a count of the total number of computing device(s) hardware model types within the networked environment. In a specific example, the graph displays a numerical and/or graphical representation of the number of computing device(s) hardware model types, where the hardware model types may be related to specific and/or individual hardware type or an aggregate or one or more hardware types. In such an embodiment, the system may present the hardware model type count of the networked environment via a bar graph 902, wherein the horizontal axis of the bar graph denotes a numerical sum/count of computing devices or servers within the networked environment, and the vertical axis defines a corresponding hardware model type (e.g. hardware model name or identifier). For example, as illustrated in FIG. 9, the system may be configured to present a bar graph 902 that displays, the networked environment has a total of 16 computing devices of hardware model type A, the networked environment has a total of 6 computing devices of hardware model type B, the networked environment has a total of 1 computing device of hardware model type C, and the like.

As illustrated in FIG. 10A, in one embodiment, the infrastructure trend may be related to an operating system version count of computing devices for the current month and in response to a user selecting the option to present current month charts, the system may present a graph that displays a count of the total number of computing device(s) with a specific operating system version within the networked environment. In a specific example, the graph displays a numerical and/or graphical representation of the number of computing device(s) with a specific operating system version. In such an embodiment, the system may present the operating system version count of the networked environment via a bar graph 1002A, wherein the vertical axis of the bar graph denotes a numerical sum/count of computing devices or servers within the networked environment, and the horizontal axis defines a corresponding operating system version. For example, as illustrated in FIG. 10A, the system may be configured to present a bar graph 1002A that displays, the networked environment has a total of 107 computing devices with version 10 of the operating system installed, the networked environment has a total of 7 computing devices with version 9 of the operating system installed, and the networked environment has a total of 39 computing devices with version 8 of the operating system installed. In addition to presenting a bar graph 1002A or another graphical representation, the system may also be configured to present a legend 1004A that details which month the bar graph 1002A corresponds to.

Likewise, as illustrated in FIG. 10B, in one embodiment, the infrastructure trend may be related to an operating system version count of computing devices for a plurality of months and in response to a user selecting the option to present infrastructure month to month trending, the system may present a graph that displays a count of the total number of computing device(s) with a specific operating system version within the networked environment on a month to month basis. The graph may be further categorized based on the corresponding month and/or year. As such, in addition to presenting a bar graph 1002B or another graphical representation, the system may also be configured to present a legend 1004 that details which portion of the bar graph 1002B corresponds to a specific month. For example, as illustrated in FIG. 10B, the system may be configured to present a bar graph 1002B that displays the networked environment had a total of 172 computing devices with version 10 of the operating system installed in the month of July, the networked environment had a total of 118 computing devices with version 10 of the operating system installed in the month of August, the networked environment had a total of 116 computing devices with version 10 of the operating system installed in the month of September, and the networked environment had a total of 107 computing devices with version 10 of the operating system installed in the month of October.

As illustrated in FIG. 11, in one embodiment, the infrastructure trend may be related to a kernel level count of any given operating system and in response to a user selecting the option to present current month charts, the system may present a graph that displays a count of the total number of computing device(s) with a specific kernel version, for any given operating system, within the networked environment. In a specific example, the graph displays a numerical and/or graphical representation of the number of computing device(s) with a specific kernel version. In such an embodiment, the system may present the kernel version count of the networked environment via a bar graph 1102, wherein the vertical axis of the bar graph denotes a numerical sum/count of computing devices or servers within the networked environment, and the horizontal axis defines a corresponding kernel level and/or version. For example, as illustrated in FIG. 11, the system may be configured to present a bar graph 1102 that displays in the month of October the networked environment has a total of 27 computing devices with version 3 of a kernel for a specific operating system. In addition to presenting a bar graph 1102 or another graphical representation, the system may also be configured to present a legend 1104 that details which month the bar graph 1102 corresponds to.

As illustrated in FIG. 12, in one embodiment, the infrastructure trend may be related to an application count of any given application and in response to a user selecting the option to present current month charts, the system may present a graph that displays a count of the total number of computing devices that have a specific number of instances of an application. In a specific example, the graph displays a numerical and/or graphical representation of the number of computing device(s) with a specific number of instances of an application. In such an embodiment, the system may present the application count of the computing device(s) via a bar graph 1202, wherein the vertical axis of the bar graph denotes a numerical sum/count of computing devices or servers within the networked environment, and the horizontal axis defines a corresponding number of instances for a single application. For example, as illustrated in FIG. 12, the system may be configured to present a bar graph 1202 that displays in the month of October 1,511 computing devices had 0 instances or versions of the application installed, 201 computing devices had 1 instance or version of the application installed, 117 computing devices had 2 instances or versions of the application installed, 13 computing devices had 3 instances or versions of the application installed, and 3 computing devices had 4 instances or versions of the application installed. In addition to presenting a bar graph 1202 or another graphical representation, the system may also be configured to present a legend 1204 that details which month the bar graph 1202 corresponds to.

As illustrated in FIG. 13A, in one embodiment, the infrastructure trend may be related to an application version count of applications for the current month and in response to a user selecting the option to present current month charts, the system may present a graph that displays a count of the total number of computing device(s) with a specific application version within the networked environment. In a specific example, the graph displays a numerical and/or graphical representation of the number of computing device (s) with a specific application version. In such an embodiment, the system may present the application version count of the computing devices via a bar graph 1302A, wherein the vertical axis of the bar graph denotes a numerical sum/count of computing devices or servers within the networked environment, and the horizontal axis defines a corresponding application version. For example, as illustrated in FIG. 13A, the system may be configured to present a bar graph 1302A that displays the networked environment has a total of 142 computing devices with version 3.1 of an application installed, the networked environment has a total of 87 computing devices with version 3.2 of an application installed, and the networked environment has a total of 27 computing devices with version 4.0 of an application installed. In addition to presenting a bar graph 1002A or another graphical representation, the system may also be configured to present a legend 1004A that details which month the bar graph 1002A corresponds to.

Likewise, as illustrated in FIG. 13B, in one embodiment, the infrastructure trend may be related to an application version count of computing devices for a plurality of months and in response to a user selecting the option to present infrastructure month to month trending, the system may present a graph that displays a count of the total number of computing device(s) with a specific application version on a month to month basis. The graph may be further categorized based on the corresponding month and/or year. As such, in addition to presenting a bar graph 1302B or another graphical representation, the system may also be configured to present a legend 1304B that details which portion of the bar graph 1302B corresponds to a specific month. For example, as illustrated in FIG. 13B, the system may be configured to present a bar graph 1302B that displays, the networked environment had a total of 167 computing devices with version 3.1 of the application installed in the month of July, the networked environment had a total of 160 computing devices with version 3.1 of the application installed in the month of August, the networked environment had a total of 154 computing devices with version 3.1 of the application installed in the month of September, and the networked environment had a total of 142 computing devices with version 3.1 of the operating system installed in the month of October.

As illustrated in FIG. 14A, in one embodiment, the infrastructure trend may be related to an application status of any given application for the current month and in response to a user selecting the option to present system health information, the system may present a graph that displays a count of the total number of computing device(s) application status of any given application. In a specific example, the graph displays a numerical and/or graphical representation of the number of computing device(s) hardware types, where the application status may refer to whether an application is running or not running. In such an embodiment, the system may present the application status of an application via a bar graph 1402A, wherein the vertical axis of the bar graph denotes a numerical sum/count of computing devices or servers within the networked environment, and the horizontal axis defines a corresponding identifying the application as either not running or running. For example, as illustrated in FIG. 8A, the system may be configured to present a bar graph 1402A that displays the networked environment has a total of 45 computing devices on which the application is not running, and the networked environment has a total of 1,800 computing devices on which the application is running.

Likewise, as illustrated in FIG. 14B, in one embodiment, the infrastructure trend may be related to an application status of any given application for a plurality of months and in response to a user selecting the option to present infrastructure month to month trending, the system may present a graph that displays a count of the total number of computing device(s) application status of any given application on a month to month basis. The graph may be further categorized based on the corresponding month and/or year. As such, in addition to presenting a bar graph 1402B or another graphical representation, the system may also be configured to present a legend 1404B that details which portion of the bar graph 1402B corresponds to a specific month. For example, as illustrated in FIG. 14B, the system may be configured to present a bar graph 1402B that displays in the month of August the networked environment had a total of 5 computing devices on which the application was not running, and the networked environment had a total of 65 computing devices on which the application is not running.

As illustrated by FIG. 15, in response to a user selecting the option to present a current month report, the system may generate a user interface 1500 in which the user may view and interact with the raw data 1502, provided by the electronic data collection script, from which the graphs are generated. The user interface 1500 may comprise a user input field 1504 for receiving user input which defines search criteria for searching the raw data. A drop down menu 1506 may further be provided in which the drop down menu may indication additional actions for interacting with the raw data. The actions may include, but not be limited to, selecting columns, filter options, specifying a number of rows per page to be displayed, specifying a format, a flashback option, a reset option, a help option, and an option to download the raw data. The user interface 1500 may additionally comprise a chart definition panel 1508, where the user may define the chart type (e.g. including but not limited to, bar graphs, pie charts, line graphs, and the like), label, value, function, and sorting value for any given chart from which the raw data may be used to display a particular infrastructure trend. The raw data may include information such as a numerical identifier, the host name, the operating system, kernel version, enterprise architecture, industry standard, uptime, installed application versions, application statuses, and the like.

As illustrated by FIG. 16, in response to a user selecting the option to present industry standard definitions, the system may generate a user interface 1600 in which the user may view and interact with the industry standard definitions 1602, provided by the business entity or a third party via one or more databases, datasets, manual inputs, and the like. In this way, the system may automatically obtain or import industry standard definitions into the infrastructure trending tool from an external source. The user interface 1600 may comprise a user input field 1504 for receiving user input which defines search criteria for searching the industry standards. A drop down menu 1506 may further be provided in which the drop down menu may indication additional actions for interacting with the industry standards or defining a number of rows to be displayed. The industry standard definition may include information such as a numerical identifier, classification, N Level, N Value, Version, Name (e.g. short, long, generic), and the like. Furthermore, in response to a user selecting the option to present archived reports, the system may generate a user interface in which the user may view and interact with archived reports that have been previously generated and stored by the system may a predetermined period of time. It should be noted that the user may have the same functionality of current month reports when viewing archived reports.

Network Environment for Providing an Infrastructure Trending Tool

Referring to FIG. 17, a network environment is illustrated in accordance with embodiments of the present invention. As illustrated in FIG. 17, the storage location 1702 is operatively coupled via a network 1701 to the user computing device 1704 and/or a networked environment of computing devices/servers 1706. In this configuration, the storage location 1702 may send information to and receive information from the user computing device 1704 and/or the networked environment of computing devices/servers 1706. Additionally, the user computing device 1704 may send and receive information directly from the networked environment of computing devices/servers 1706. The storage location 502 may be or include one or more network base stations or other network components. FIG. 17 illustrates only one example of an embodiment of a network environment 1700, and it will be appreciated that in other embodiments one or more of the systems, devices, or servers may be combined into a single system, device, or server, or be made up of multiple systems, devices, or server.

The network 1701 may be a global area network (GAN), such as the Internet, a wide area network (WAN), a local area network (LAN), a telecommunication network or any other type of network or combination of networks. The network 1701 may provide for wire line, wireless, or a combination wire line and wireless communication between devices on the network 1701.

As illustrated in FIG. 17, the storage location 1702 generally comprises a communication device 1750, a processing device 1752, and a memory device 1754. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combination of the foregoing. Control and signal processing functions of the system are allocated between these processing devices according to their respective capabilities. The processing device may include functionality to operate one or more software programs based on computer readable instructions thereof, which may be stored in a memory device.

The processing device 1752 is operatively coupled to the communication device 1750 to communicate with the network 1701 and other devices on the network 1701. As such, the communication device 1750 generally comprises a modem, server, or other device for communicating with other devices on the network 1701.

As further illustrated in FIG. 17, the network storage location 1702 comprises computer readable instructions 1758 of an application 1760. In some embodiments, the memory device, 1754 includes data storage 1756 for storing data related to and/or used by the application 1760. The application 1760 may perform one or more of the steps and/or sub-steps discussed herein and/or one or more steps not discussed herein. For example, in some embodiments, the application 1760 may provide information stored from the electronic data collection script.

As illustrated in FIG. 17, the user computing device 1704 generally comprises a communication device 1730, a processing device 1732, and a memory device 1734. The processing device 1732 is operatively coupled to the communication device 1730 and the memory device 1734. In some embodiments, the processing device 1732 may send or receive data from the user computing device 1704, to the storage location 1702 via the communication device 1730 over a network 1701. As such, the communication device 1730 generally comprises a modem, server, or other device for communicating with other devices on the network 1701.

As further illustrated in FIG. 17, the user computing device 1704 comprises computer readable instructions 1738 stored in the memory device 1734, which in one embodiment includes the computer-readable instructions 1738 of an infrastructure trending application 1760. In the embodiment illustrated in FIG. 17, the application 1760 allows the user computing device 1704 to be linked to the storage location 1702 to communicate, via a network 1701. The application 1760 may also allow the user computing device 1704 to connect directly (i.e. locally or device to device) with the networked environment of computing devices/servers 1706 for sending and receiving information. The application 1760 may perform one or more of the steps and/or sub-steps discussed herein and/or one or more steps not discussed herein. For example, in some embodiments, the infrastructure trending application 1760 may request information from the storage location for generating an infrastructure trending graph.

As illustrated in FIG. 17, a computing device/server within the networked environment 1706 may include a communication device 1710, a processing device 1712, and a memory device 1714. The processing device 1712 is operatively coupled to the communication device 1710 and the memory device 1714. In some embodiments, the processing device 1712 may send or receive data from the user computing device 1704 and/or the storage location 1702 via the communication device 1710. Such communication may be performed either over a direct connection and/or over a network 1701. As such, the communication device 1710 generally comprises a modem, server, or other device for communication with other devices on the network 1701.

As further illustrated in FIG. 17, the networked environment of computing devices/servers 1706 comprises computer-readable instructions 1718 of an application 1720. In the embodiment illustrated in FIG. 4, the application 1720 allows the database 1706 to be linked to the storage location 1702 to communicate, via a network 1701. The application 1720 may also allow the user computing device 1704 to connect directly (i.e., locally or device to device) with the networked environment of computing devices/servers 1706 or indirectly through the network 1701. The application 1720 may perform one or more of the steps and/or sub-steps discussed herein and/or one or more steps not discussed herein.

Any of the features described herein with respect to a particular process flow are also applicable to any other process flow. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for use in providing infrastructure trending within a network environment, whereby the apparatus proactively queries computing devices within the networked environment and generates infrastructure trending data for use in conforming the computing devices with enterprise compliance rules, the apparatus comprising:
   a memory;
   a computing processor; and
   a module stored in the memory, said module comprising instruction code executable by one or more computing processors, and configured to cause the one or more computing processors to:
      execute an electronic data collection script on one or more computing devices within a networked environment, wherein the electronic data collection script queries the one or more computing devices to electronically collect machine information, wherein the machine information comprises information related to a specific software application, wherein executing the electronic data collection script comprises:
         querying the networked environment to discover the one or more computing devices;

in response to discovering the one or more computing devices, automatically configuring the one or more computing devices for electronic data collection by (1) storing the electronic data collection script locally on the one or more computing devices and (2) transmitting an initiation command to the one or more computing devices, the data collection script being configured to automatically execute locally on the one or more computing devices in response to receiving the initiate command;

determine a frequency at which the specific software application is updated;

in response to determining the frequency at which the specific software application is updated, automatically modify the electronic data collection script to increase a frequency of data collection;

store the collected machine information in a storage location, whereby the machine information can be accessed, via the storage location, for use in providing infrastructure trending data;

receive a request to display an infrastructure trend associated with the network environment;

in response to receiving the request, analyze the collected machine information;

generate at least one graph based on the collected machine information, wherein the at least one graph displays the infrastructure trend associated with the network environment;

provide one or more recommendations for future infrastructure implementation based at least in part on the analysis of the collected machine information and the at least one graph displaying the infrastructure trend;

continuously analyze the electronic data collection script to determine one or more areas of improvement; and in response to determining an area of improvement within the electronic data collection script, automatically modify the electronic data collection script.

2. The apparatus of claim 1, wherein the module is further configured to cause one or more computing processors to present the collected machine information in a raw data format.

3. The apparatus of claim 1, wherein the module is further configured to cause one or more computing processors to determine an industry standard definition, wherein the industry standard definition defines an operating system requirement for the one or more computing devices.

4. The apparatus of claim 3, wherein the module is further configured to cause one or more computing processors to associate the industry standard definition with an alphanumeric identifier.

5. The apparatus of claim 3, wherein the module is further configured to cause one or more computing processors to update the industry standard definition in response to determining a new version of an operating system is utilized within the networked environment.

6. The apparatus of claim 3, wherein the module is further configured to cause one or more computing processors to sort the at least one graph based at least in part on the industry standard definition.

7. The apparatus of claim 1, wherein the module is further configured to cause one or more computing processors to determine a status of the one or more computing devices, wherein the status is at least one of development, user acceptance testing, quality assurance, or production.

8. The apparatus of claim 1, wherein the machine information comprises information related to a specific machine parameter, and wherein the module is further configured to cause one or more computing processors to aggregate the collected machine information and determine a numeric total of the one or more computing device on which the machine parameter is present.

9. The apparatus of claim 1, wherein the module is further configured to cause one or more computing processors to transmit the at least one graph to a third party.

10. The apparatus of claim 1, wherein the module is further configured to cause one or more computing processors to archive the at least one graph for future presentation, wherein the at least one graph is archived for a predetermined period of time.

11. The apparatus of claim 3, wherein the one or more recommendations for future infrastructure implementation are based at least in part on the industry standard definition.

12. A computer program product for use in providing infrastructure trending within a network environment, whereby the apparatus proactively queries computing devices within the networked environment and generates infrastructure trending data for use in conforming the computing devices with enterprise compliance rules, the computer program product comprising:

a non-transitory computer-readable medium comprising a set of codes for causing a computer to:

execute an electronic data collection script on one or more computing devices within a networked environment, wherein the electronic data collection script queries the one or more computing devices to electronically collect machine information, wherein the machine information comprises information related to a specific software application, wherein executing the electronic data collection script comprises:

querying the networked environment to discover the one or more computing devices;

in response to discovering the one or more computing devices, automatically configuring the one or more computing devices for electronic data collection by (1) storing the electronic data collection script locally on the one or more computing devices and (2) transmitting an initiation command to the one or more computing devices, the data collection script being configured to automatically execute locally on the one or more computing devices in response to receiving the initiate command;

determine a frequency at which the specific software application is updated;

in response to determining the frequency at which the specific software application is updated, automatically modify the electronic data collection script to increase a frequency of data collection;

store the collected machine information in a storage location, whereby the machine information can be accessed, via the storage location, for use in providing infrastructure trending data;

receive a request to display an infrastructure trend associated with the network environment;

in response to receiving the request, analyze the collected machine information;

generate at least one graph based on the collected machine information, wherein the at least one graph displays the infrastructure trend associated with the network environment;

provide one or more recommendations for future infrastructure implementation based at least in part on the analysis of the collected machine information and the at least one graph displaying the infrastructure trend;

continuously analyze the electronic data collection script to determine one or more areas of improvement; and in response to determining an area of improvement within the electronic data collection script, automatically modify the electronic data collection script.

13. The computer program product of claim 12, the computer program product further comprising a set of codes for causing a computer to determine an industry standard definition, wherein the industry standard definition defines an operating system requirement for the one or more computing devices.

14. The computer program product of claim 13, wherein the one or more recommendations for future infrastructure implementation are based at least in part on the industry standard definition.

15. A method for use in providing infrastructure trending within a network environment, whereby the apparatus proactively queries computing devices within the networked environment and generates infrastructure trending data, the method comprising:

executing an electronic data collection script on one or more computing devices within a networked environment, wherein the electronic data collection script queries the one or more computing devices to electronically collect machine information, wherein the machine information comprises information related to a specific software application, wherein executing the electronic data collection script comprises:

querying the networked environment to discover the one or more computing devices;

in response to discovering the one or more computing devices, automatically configuring the one or more computing devices for electronic data collection by (1) storing the electronic data collection script locally on the one or more computing devices and (2) transmitting an initiation command to the one or more computing devices, the data collection script being configured to automatically execute locally on the one or more computing devices in response to receiving the initiate command;

determining a frequency at which the specific software application is updated;

in response to determining the frequency at which the specific software application is updated, automatically modifying the electronic data collection script to increase a frequency of data collection;

storing the collected machine information in a storage location, whereby the machine information can be accessed, via the storage location, for use in providing infrastructure trending data;

receiving a request to display an infrastructure trend associated with the network environment;

in response to receiving the request, analyzing the collected machine information;

generating at least one graph based on the collected machine information, wherein the at least one graph displays the infrastructure trend associated with the network environment;

providing one or more recommendations for future infrastructure implementation based at least in part on the analysis of the collected machine information and the at least one graph displaying the infrastructure trend;

continuously analyzing the electronic data collection script to determine one or more areas of improvement; and in response to determining an area of improvement within the electronic data collection script, automatically modifying the electronic data collection script.

16. The method of claim 15, wherein the method may further comprise determining an industry standard definition, wherein the industry standard definition defines an operating system requirement for the one or more computing devices.

17. The method of claim 16, wherein the one or more recommendations for future infrastructure implementation are based at least in part on the industry standard definition.

* * * * *